United States Patent
Twigger (10) Patent No.: US 12,128,791 B2
(45) Date of Patent: Oct. 29, 2024

(54) CHARGING OF ELECTRIC VEHICLES AND CONSTRUCTION MACHINES

(71) Applicant: Perkins Engines Company Limited, Peterborough (GB)

(72) Inventor: Thomas Twigger, Spalding (GB)

(73) Assignee: Perkins Engines Company Limited, Peterborough (GB)

( * ) Notice: Subject to any disclaimer, the term of this patent is extended or adjusted under 35 U.S.C. 154(b) by 231 days.

(21) Appl. No.: 17/911,720

(22) PCT Filed: Mar. 9, 2021

(86) PCT No.: PCT/EP2021/025097
§ 371 (c)(1),
(2) Date: Sep. 15, 2022

(87) PCT Pub. No.: WO2021/185480
PCT Pub. Date: Sep. 23, 2021

(65) Prior Publication Data
US 2023/0339361 A1 Oct. 26, 2023

(30) Foreign Application Priority Data
Mar. 20, 2020 (GB) ..................... 2004110

(51) Int. Cl.
*B60L 58/13* (2019.01)
*B60L 53/62* (2019.01)
(Continued)

(52) U.S. Cl.
CPC ............... *B60L 58/13* (2019.02); *B60L 53/62* (2019.02); *B60L 58/24* (2019.02);
(Continued)

(58) Field of Classification Search
CPC .......... B60L 58/13; B60L 53/62; B60L 58/24; H01M 10/625; H01M 10/63
See application file for complete search history.

(56) References Cited

U.S. PATENT DOCUMENTS 8,989,954 B1 * 3/2015 Addepalli ............... H04W 4/10
701/32.7
9,884,631 B2 * 2/2018 James ................... B60W 50/14
(Continued)

FOREIGN PATENT DOCUMENTS

EP 2398670 A1 12/2011
JP 2012044813 A 3/2012
(Continued)

OTHER PUBLICATIONS

GB Search Report related to Application No. 2004110.9; reported on Sep. 9, 2020.
(Continued)

*Primary Examiner* — Ramsey Refai (57) ABSTRACT

A method for managing state of charge of a battery of an electric work vehicle to be ready to return to work at a return to work time. Data comprising an expected date and time of return to work is obtained from the output of a user interface and used to calculate an expected duration of immobilization of the electric work vehicle. A charge rate is determined based on the expected duration of immobilization of the work vehicle and a targeted charge increase. A charging start time is calculated such that at the return to work time an actual state of charge of the battery is a target operational state of charge value. The temperature of the battery is adjusted such that the battery is at a target temperature at the charging start time. The charge cycle is started at the charging start time.

15 Claims, 6 Drawing Sheets

(51) Int. Cl.
*B60L 58/24* (2019.01)
*H01M 10/625* (2014.01)
*H01M 10/63* (2014.01)

(52) U.S. Cl.
CPC ......... *H01M 10/625* (2015.04); *H01M 10/63* (2015.04); *B60L 2200/40* (2013.01); *B60L 2250/14* (2013.01); *B60L 2260/58* (2013.01); *H01M 2220/20* (2013.01)

(56) References Cited

U.S. PATENT DOCUMENTS

| | | | | |
|---|---|---|---|---|
| 9,958,864 | B2* | 5/2018 | Kentley-Klay | G05D 1/0287 |
| 10,259,448 | B2* | 4/2019 | Bucknor | B60W 10/08 |
| 10,343,631 | B2* | 7/2019 | Poeppel | B62D 15/0285 |
| 10,386,836 | B2* | 8/2019 | Lockwood | G05D 1/0027 |
| 10,611,258 | B2* | 4/2020 | Symanow | B60W 50/14 |
| 10,752,116 | B2* | 8/2020 | Symanow | B60R 16/033 |
| 10,766,442 | B2* | 9/2020 | Kwon | H02J 9/061 |
| 11,065,974 | B2* | 7/2021 | Kodera | B60L 53/68 |
| 11,072,258 | B2* | 7/2021 | Kumar | B60L 50/60 |
| 2014/0018975 | A1* | 1/2014 | Maslyn | B60L 50/40 |
| | | | | 701/1 |
| 2015/0051763 | A1* | 2/2015 | Enomoto | B60L 3/12 |
| | | | | 701/22 |
| 2017/0123421 | A1* | 5/2017 | Kentley | G01C 21/3453 |
| 2017/0355371 | A1* | 12/2017 | Higgins | B60W 10/06 |
| 2018/0050686 | A1* | 2/2018 | Atluri | B60W 20/13 |
| 2018/0105175 | A1* | 4/2018 | Muller | B60W 50/082 |
| 2018/0134176 | A1* | 5/2018 | Symanow | B60L 58/20 |
| 2018/0173219 | A1* | 6/2018 | Lee | G01C 21/3492 |
| 2018/0334158 | A1* | 11/2018 | Chen | B60W 10/30 |
| 2019/0212997 | A1* | 7/2019 | Sangameswaran | H04L 67/52 |
| 2020/0298724 | A1* | 9/2020 | Rhodes | G05D 1/0088 |
| 2020/0353944 | A1* | 11/2020 | Urano | G05D 1/0088 |
| 2021/0237667 | A1* | 8/2021 | Zheng | G07C 5/085 |
| 2021/0407303 | A1* | 12/2021 | Yogesha | G08G 5/006 |

FOREIGN PATENT DOCUMENTS

| | | |
|---|---|---|
| WO | 2006018695 A1 | 2/2006 |
| WO | 2019002193 A1 | 1/2019 |
| WO | 2020084964 A1 | 4/2020 |

OTHER PUBLICATIONS

International Search Report related to Application No. PCT/EP2021/025097; reported on Jun. 29, 2021.

* cited by examiner

Fig. 6

# CHARGING OF ELECTRIC VEHICLES AND CONSTRUCTION MACHINES

CROSS-REFERENCE TO RELATED APPLICATION

This Application is a 35 USC § 371 US National Stage filing of International Application No. PCT/EP2021/025097 filed on Mar. 9, 2021 which claims priority under the Paris Convention to Great Britain Patent Application No. 2004110.9 filed on Mar. 20, 2020.

FIELD OF THE DISCLOSURE

The disclosure relates to the field of charging electric vehicles or construction machines.

BACKGROUND

An electric vehicle or construction machine may comprise a storage battery inside the electric vehicle that is charged with power using an external vehicle charging apparatus. Conventionally, many electric vehicles default to a fast charge scenario, assuming that the operator wants the vehicle to be ready for use as soon as possible. The battery is then held at a high state of charge until it is used.

The health of a storage battery depends on several factors, including the rate at which the battery is charged, the state of charge at which the battery is stored and the temperature of the battery during charging. Fast charging can increase battery ageing, for example due to thermal shock. Many batteries can only undergo a limited number of fast charge cycles before performance degradation occurs to an extent that limits the battery capacity to below an acceptable value. Storing a battery at high state of charge also increases battery ageing.

It is known to provide functionality for a user to choose a charging mode based on information about the cost of electricity (U.S. Pat. No. 8,716,978 B2). The lowest cost of power may be determined on the basis of a predetermined time period for charging, and the user can choose whether to proceed with fast charging or to wait to charge the vehicle at the charging period with the lowest cost.

It is known to provide a charging management system that stores the battery at low state of charge and charges just before the electric vehicle is required, rather than charging immediately and storing the battery at a high state of charge (EP 2398670 A1). The duration of immobilization of the vehicle and the time taken for a full charge from the initial state of the battery are used to schedule charging such that the battery remains in a low state of charge for as long as possible in storage, and the battery reaches the highest level of charge just before the vehicle is used.

Storing batteries at low state of charge may be important for long-term battery health, however it may also be preferable to use lower charge rates. Particularly in the case of electric work vehicles with long, known periods of immobilization it may be useful to manage charging such that the storage state of charge is low and the rate of charging is also low.

Small off-highway electrified construction machinery may typically be operational between predicable times. For example, such electric work vehicles might be expected to work a single shift in a day, 5 days a week and be unused overnight and at weekends. They may also be put into long term storage.

SUMMARY OF THE DISCLOSURE

Against this background, there is provided; a method for managing state of charge of a battery of an electric work vehicle to be ready to return to work at a return to work time that coincides with an end of a duration of immobilization, comprising:
  a. obtaining data from the output of a user interface, wherein the data comprises an expected date and time of return to work;
  b. using the expected date and time of return to work to calculate an expected duration of immobilization of the electric work vehicle;
  c. using an initial state of charge value of the battery and a target operational state of charge value of the battery to calculate a targeted charge increase;
  d. determining a charge rate based on the expected duration of immobilization of the work vehicle and the targeted charge increase;
  e. calculating a charging start time based on the charge rate and the targeted charge increase, such that at the return to work time an actual state of charge of the battery is the target operational state of charge value;
  f. using an initial temperature of the battery and a target temperature of the battery to calculate a targeted temperature change;
  g. using the targeted temperature change to calculate a heat exchange start time such that the battery is at the target temperature at the charging start time;
  h. adjusting the temperature of the battery at the heat exchange start time such that the battery is at the target temperature at the charging start time; and
  i. starting the charge cycle at the charging start time such that the battery is at the target operational state of charge at the return to work time.

In this way, it may be possible to manage the charging of an electric work vehicle in such a way that combines considerations of long term battery health with return to work requirements. Scheduling charging in such a way allows the battery to be warmed before charging begins, to prevent thermal shock and prolong battery lifetime. The battery can be stored at a low state of charge and the charge rate can be chosen to be slower when the vehicle is not needed imminently, which slows battery degradation. Other preparation for returning to work may also be carried out. For example, work vehicles often have a hydraulic circuit for operating a work tool. Cold, viscous hydraulic fluid may result in parasitic losses which may reduce charge efficiency. It may be beneficial for the hydraulic fluid to be warmed before the vehicle is ready to return to work, which can be scheduled based on the charging schedule.

In a second aspect there is provided: a battery charging controller for managing state of charge of a battery of an electric work vehicle to be ready to return to work at a return to work time that coincides with an end of a duration of immobilization, the battery charging controller configured to:
  a. receive first data from a user interface, wherein the first data is indicative of a date and time of expected return to work;
  b. receive second data comprising an initial state of charge value of the battery;
  c. receive third data comprising an initial temperature of the battery;
  d. use the first data to calculate an expected duration of immobilization;

e. use the second data and a target operational state of charge of the battery to calculate a targeted charge increase;

f. determine a charge rate based on the expected duration of immobilization of the work vehicle, the targeted charge increase and data indicative of battery health;

g. calculate a charging start time based on the charge rate and the targeted charge increase, such that at the return to work time an actual state of charge of the battery is the target operational state of charge value;

h. use the third data and a target temperature of the battery to calculate a targeted temperature change;

i. use the targeted temperature change to calculate a heat exchange start time such that the battery is at the target temperature before the charging start time;

j. adjust the temperature of the battery at the heat exchange start time such that the battery is at the target temperature at the charging start time; and k. start the charge cycle at the charging start time such that the battery is at the target operational state of charge at the return to work time.

BRIEF DESCRIPTION OF THE DRAWINGS

A specific embodiment of the disclosure will now be described, by way of example only, with reference to the accompanying drawings in which.

DETAILED DESCRIPTION

According to an embodiment of this disclosure, there is a method for managing the state of charge of a battery of an electric work vehicle to be ready to return to work at a return to work time that coincides with an end of duration of immobilization. The battery of the electric work vehicle may be connected to an external charging device. The method determines how best to use the duration of immobilization. The method comprises charging the battery and warming the battery before charging, and may additionally comprise one or more of warming hydraulic fluid, performing a service process, warming the cab or another process suitable for readying the vehicle for return to work. There may be a controller for managing the state of charge of the battery.

Figure 1:
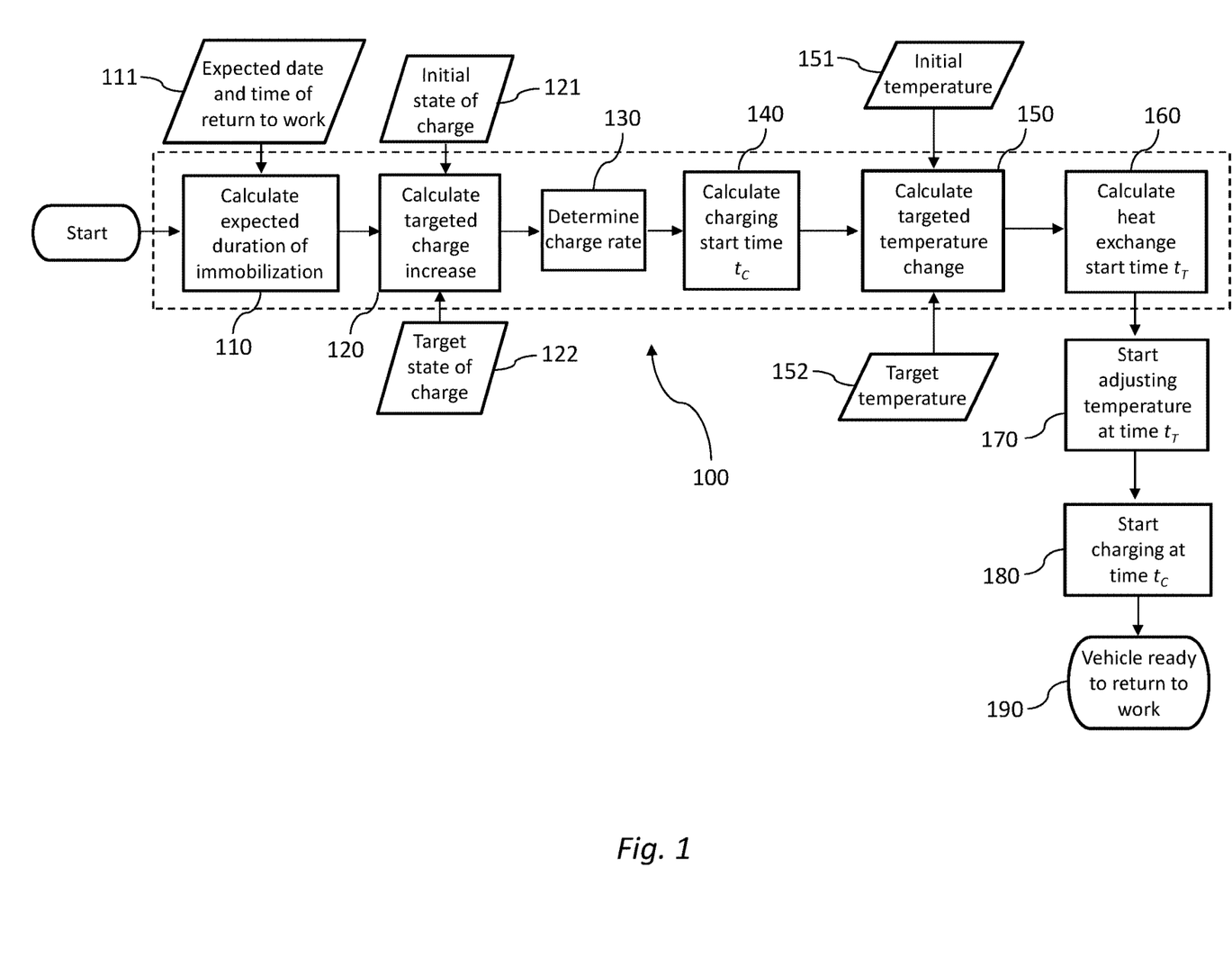
FIG. 1 shows a process for determining a charge rate and managing the state of charge of a battery in accordance with an embodiment of the disclosure.

Referring to FIG. 1, various data inputs may be used to determine a charge cycle and calculate the charging schedule. The user enters a date and time at which they expect to return to work, and therefore at which they expect to require the vehicle to be ready to return to work, via the input of a user interface. The steps which may be involved in using this input to determine the charge cycle and schedule are shown within the dashed line 100. The expected date and time of return to work 111 is obtained from an output of the user interface, and at step 110 the expected date and time of return to work 111 is used to calculate an expected duration of immobilization of the vehicle. At step 120 an initial state of charge value 121 for the battery and a target state of charge value 122 are used to calculate a targeted charge increase. An expected duration of immobilization and the calculated targeted charge increase are used to determine a charge rate at step 130 The charge rate is calculated such that the time it will take to charge the battery is less than the expected duration of immobilization of the vehicle 121. The charge rate may be constant or may vary over time. At step 140, the charge rate and targeted charge increase are used to calculate how long it will take to charge the battery from the initial state of charge value to the targeted state of charge value. The expected duration of immobilization is then used to calculate the start time for charging $t_C$ such that the actual state of charge value of the battery will be equal to the target state of charge value 122 at or before the return to work time. At step 150 an initial temperature of the battery 151 and a target temperature of the battery 152 are used to calculate a targeted temperature change. The targeted temperature change is used to calculate how long it will take to cool or heat the battery from the initial temperature 151 to the target temperature 152. The start time for the heat exchange process $t_T$ is then calculated at step 160 such that the battery reaches the target temperature 152 at or before the start time for charging $t_C$. At the heat exchange start time $t_T$ the heat exchange process begins (step 170). At the charging start time $t_C$ the battery is at the target temperature 152, and the charging begins at the charge rate associated with the selected charge cycle (step 180). At step 190 the vehicle is then ready to return to work, with an actual state of charge value equal to the target state of charge value 122, at the end of the expected duration of immobilization.

The charge rate is determined at step 130 based on the targeted charge increase and the expected duration of immobilization. In an embodiment, the charge rate may be slower than a charge rate used for fast charging. The charge rate may be calculated to benefit battery health and such that the state of charge of the battery is equal to the target state of charge 122 at or before the return to work time. In a certain embodiment, the charge cycle may be selected to have the slowest charge rate for which it is still possible to charge the battery to have a state of charge value equal to the target state of charge value at the return to work time at the end of the duration of immobilization.

Figure 2:
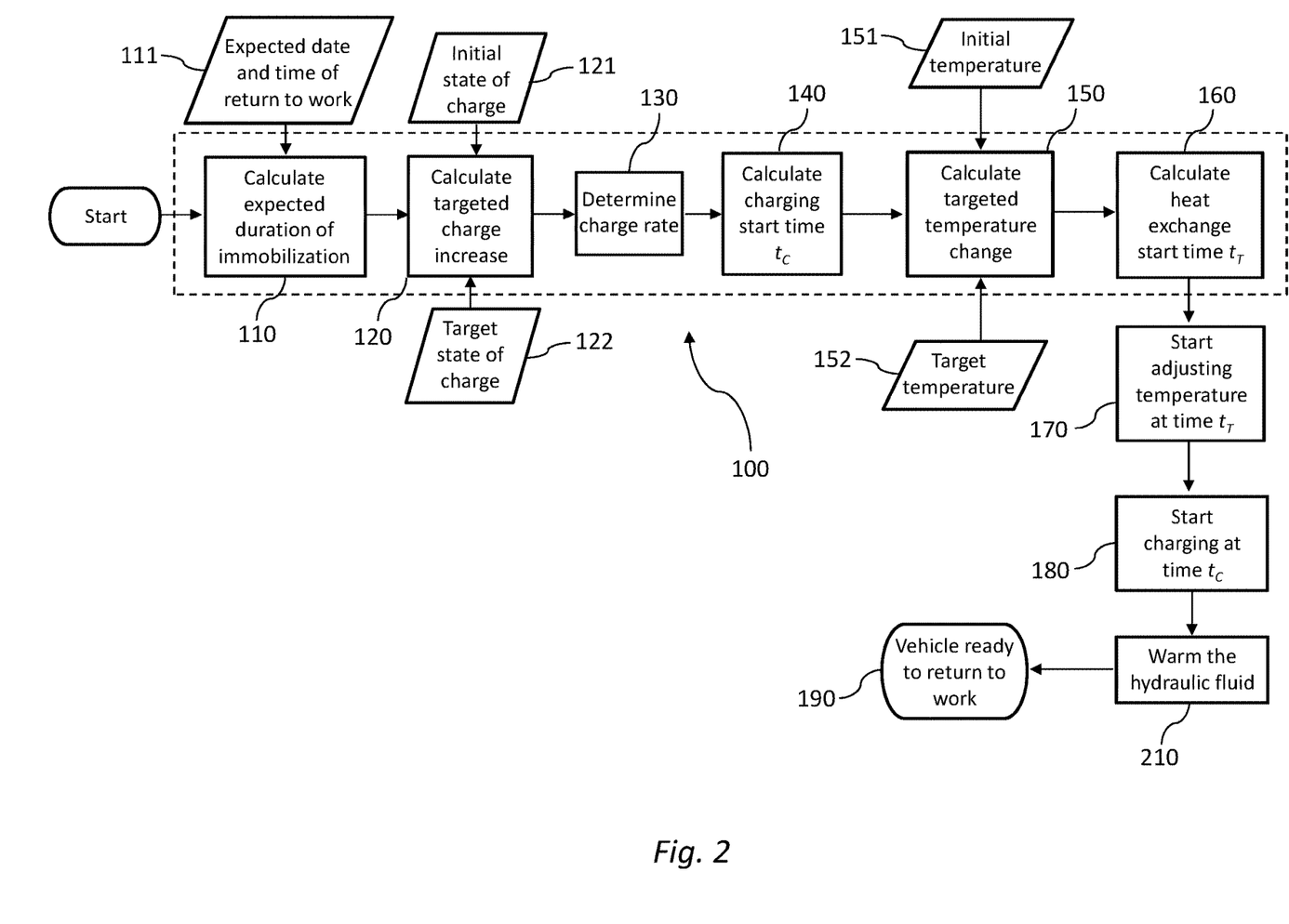
FIG. 2 shows a process for determining a charge rate, managing the state of charge of a battery and warming hydraulic fluid in accordance with an embodiment of the disclosure.

Referring to the embodiment described in FIG. 2, there is an additional step 210 of warming hydraulic fluid. Work vehicles may comprise a hydraulic circuit for effecting movement of a machine work tool. Viscous hydraulic fluid results in parasitic power losses so warming the hydraulic fluid to reduce its viscosity prior to the vehicle returning to work increases charge efficiency. The warming of the hydraulic fluid may be carried out such that the hydraulic fluid is at target operational temperature at the return to work time of the vehicle. In an embodiment of the disclosure, the warming of the hydraulic fluid may take place during charging of the battery using power from the external charging device.

Figure 3:
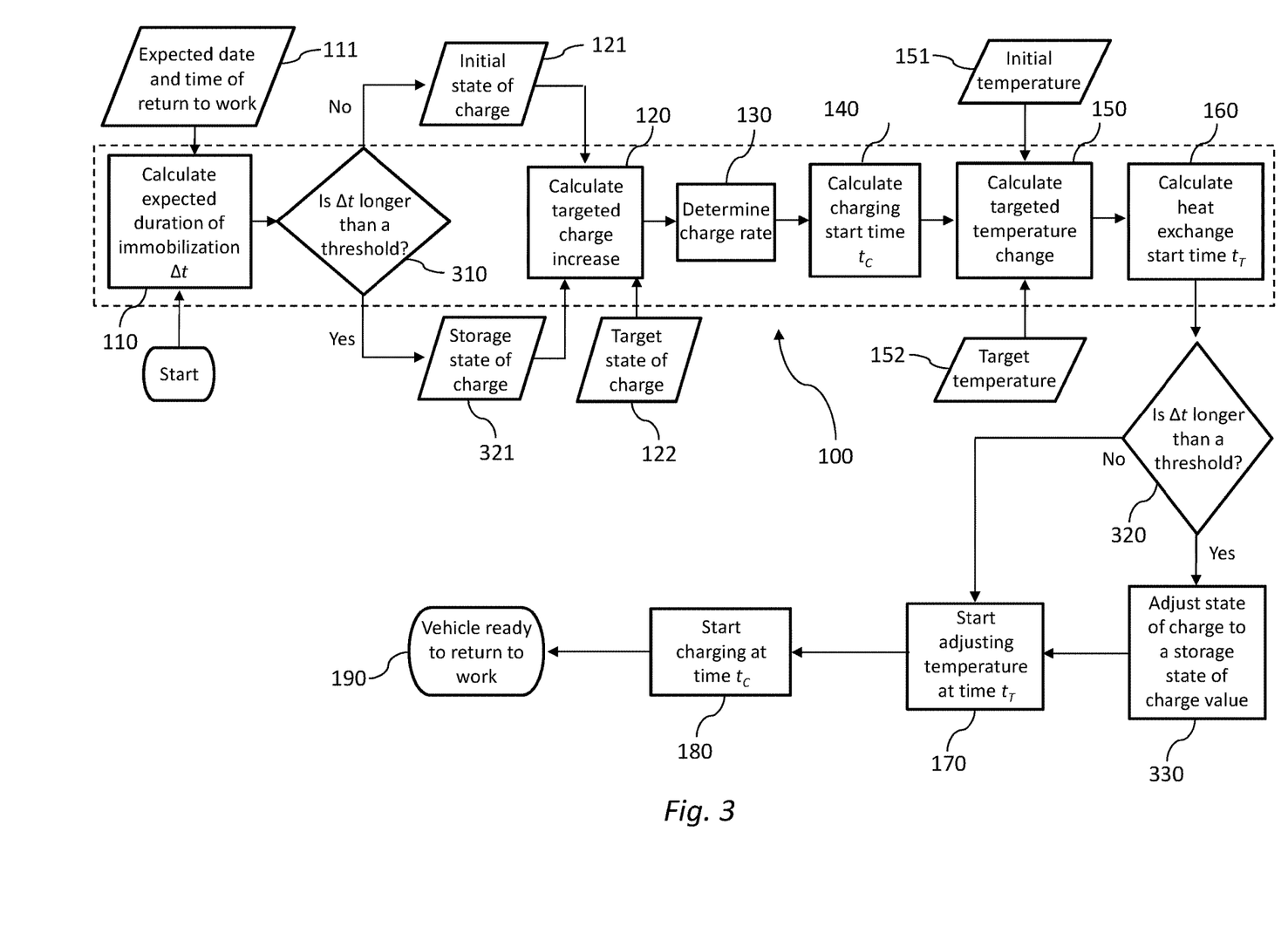
FIG. 3 shows a process for determining a charge rate and managing the state of charge of a battery wherein the battery may be stored at a storage state of charge, in accordance with an embodiment of the disclosure.

Referring to the embodiment shown in FIG. 3, there is the additional provision to store the electric vehicle at a low state of charge if the expected duration of immobilization is longer than a storage threshold value. Storing a battery at a low state of charge is beneficial for long-term battery health, however it entails an extra charge cycle of charging or discharging to a storage state of charge and then recharging it which may be detrimental to long term battery health. There is therefore a minimum length of storage time for which the benefits of storing at a low state of charge outweigh the adverse effects of the extra charge cycle. This minimum time is used as a storage threshold value to which the duration of immobilization is compared at step 310. If the duration of immobilization is expected to be less than the storage threshold, the process of charging is similar to that shown in FIG. 1 or FIG. 2. The initial state of charge value 121 of the battery is used to calculate the targeted charge increase and the battery is not charged or discharged until the charging start time $t_C$. If the duration of immobilization is longer than the storage threshold, the storage state of charge value 321 is used to calculate the targeted charge increase at step 120. After the charge rate has been determined at step 130 and the parameters calculated, the battery is discharged (or charged) to the storage state of charge value at step 330 and is held there until the charging start time $t_C$. In an embodiment of the disclosure the duration of immobilization may be compared to the storage threshold value once (at step 310, before calculating the targeted charge increase), however for clarity the comparison is shown again at step 320 to show clearly the two parts where the process differs depending on the result of the comparison. In a certain embodiment the storage state of charge value may be between 40% and 50% of full capacity.

Figure 4:
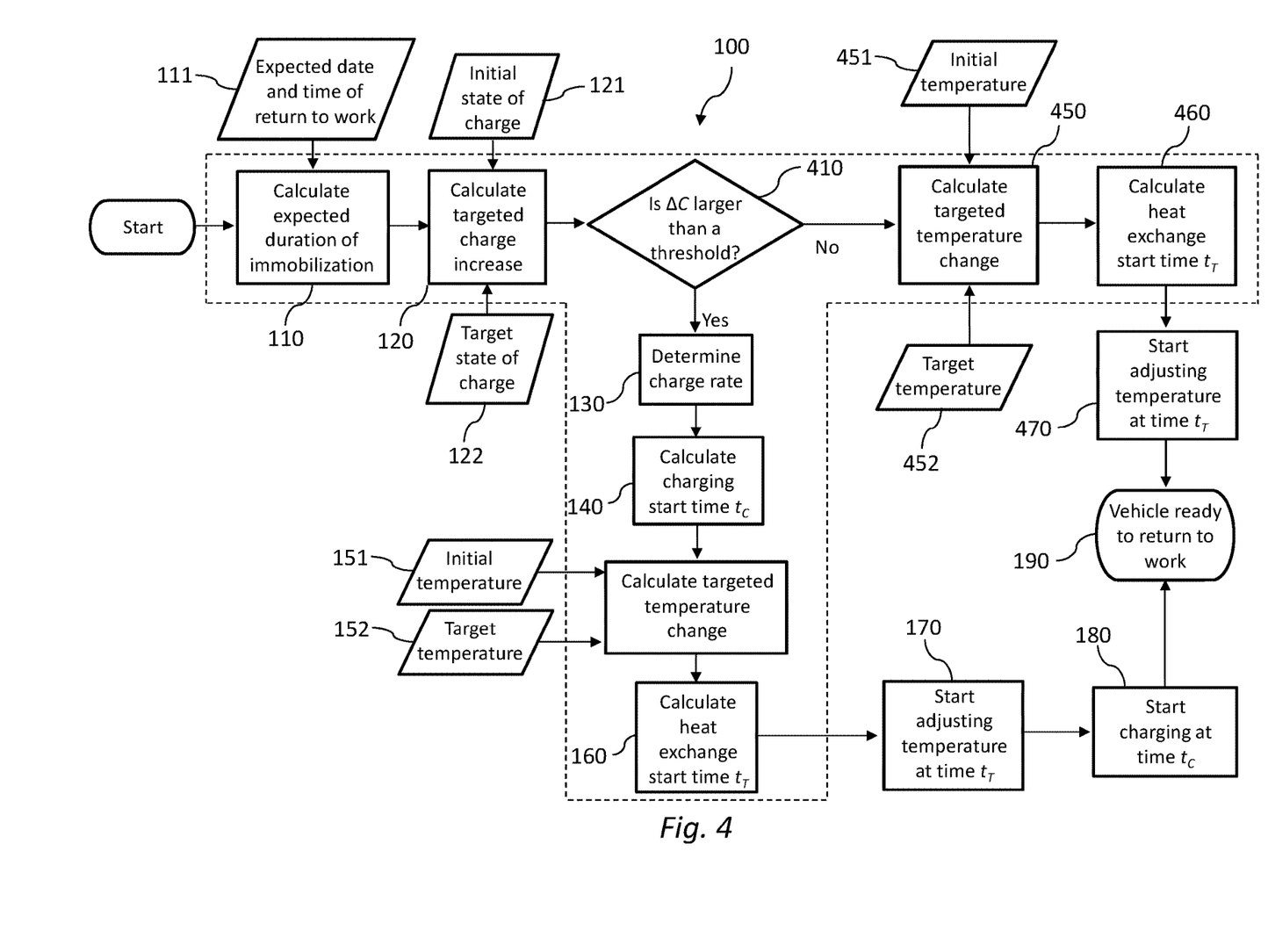
FIG. 4 shows a process for determining a charge rate and managing the state of charge of a battery wherein the battery may be charged in the event that the targeted charge increase is above a threshold, in accordance with an embodiment of the disclosure.

With reference to FIG. 4, there is an option to not charge the battery if the initial state of charge value is close to the target state of charge. The calculated targeted charge increase is compared to a charge threshold at step 410. If the targeted charge increase is lower than the charge threshold then charging does not take place. The battery or hydraulic fluid may be heated before the return to work time. The initial temperature 451 and target temperature 452 of the battery may be used to calculate the targeted temperature increase of the battery at step 450. The heat exchange start time $t_T$ is then calculated at step 460, and the temperature is adjusted at the heat exchange start time $t_T$ (step 470) such that the battery is at the target temperature at or before the return to work time. In the event that the targeted charge increase is higher than the charge threshold then the charging process may be carried out in a similar way to that shown in FIG. 1. Where the steps are the same as those in FIG. 1, the same reference numerals are used.

In an embodiment of the disclosure, the method may further comprise performing a service process before the return to work time. There may be a pre-determined list of service processes comprising the duration of each service process, the length of service process and the length of time since it was last performed. The method may further comprise deciding whether to perform one or more of the service processes. The decision as to whether to perform a service process may depend on the expected duration of immobilization of the vehicle, the duration of a service process and the length of time since the service process was last performed.

Figure 5:
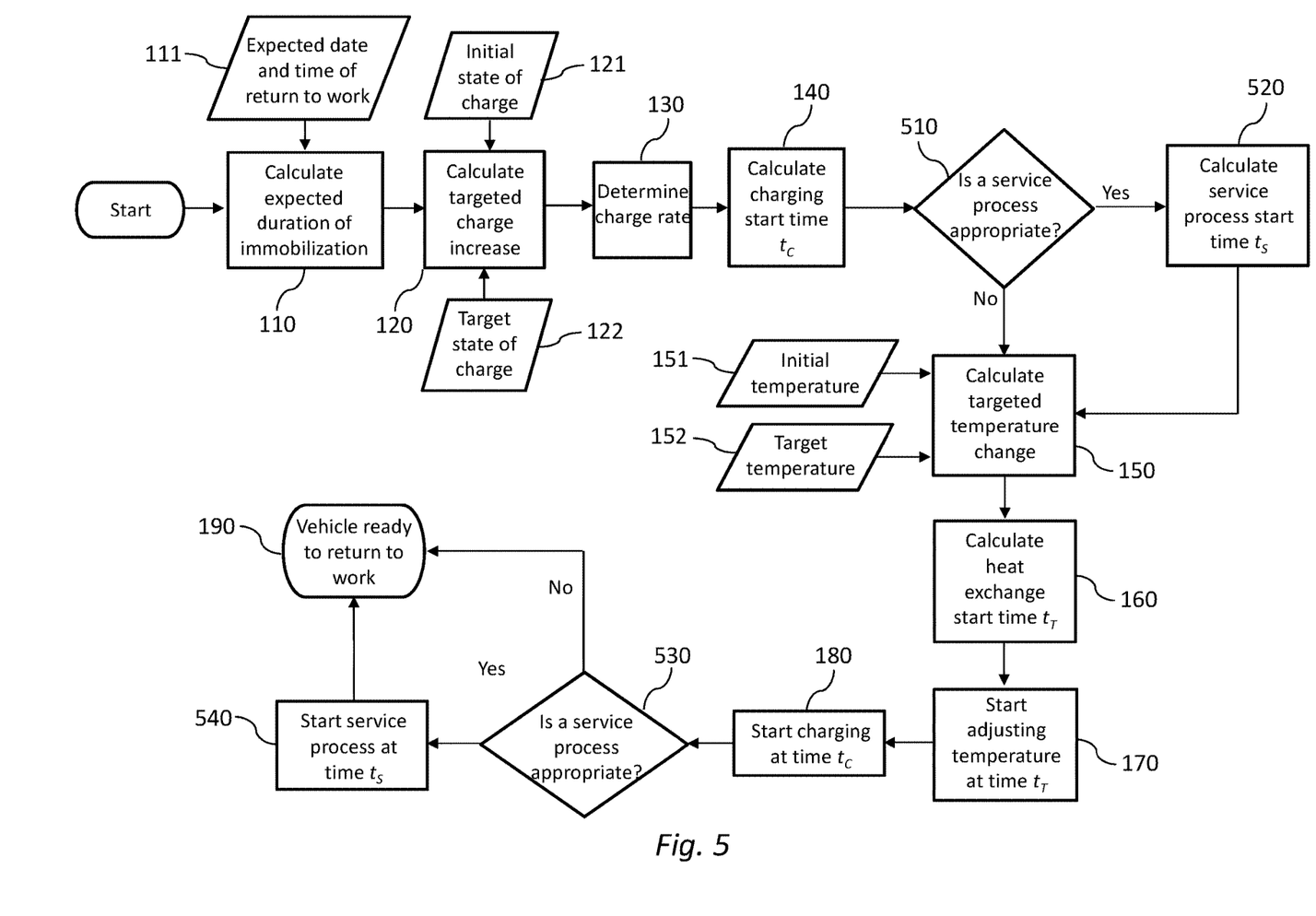
FIG. 5 shows a process for determining a charge rate and managing the state of charge of a battery wherein there may be a service process performed.

With reference to FIG. 5, there is an example of a process including a service process. In the event that a service process is appropriate (for example, based on the expected duration of immobilization of the vehicle, the duration of a service process and the length of time since the service review was last performed). At step 510, a duration of the service process is used to calculate a service process start time $t_S$ for the service process at step 520. At step 530, it may be decided whether a service process is appropriate and in the event that a service process is appropriate the service process is performed at the service process start time $t_S$ at step 540. In the event that a service process is determined not to be appropriate at step 510, the process may continue in line with the process in FIG. 1. The service process may be performed before the heat exchange start time, before the charging start time, after the vehicle is ready to return to work, or at another time before the return to work time In an embodiment of the disclosure, the method may further comprise performing one or more other processes to ready the vehicle to return to work, for example warming the cab of the vehicle.

Figure 6:
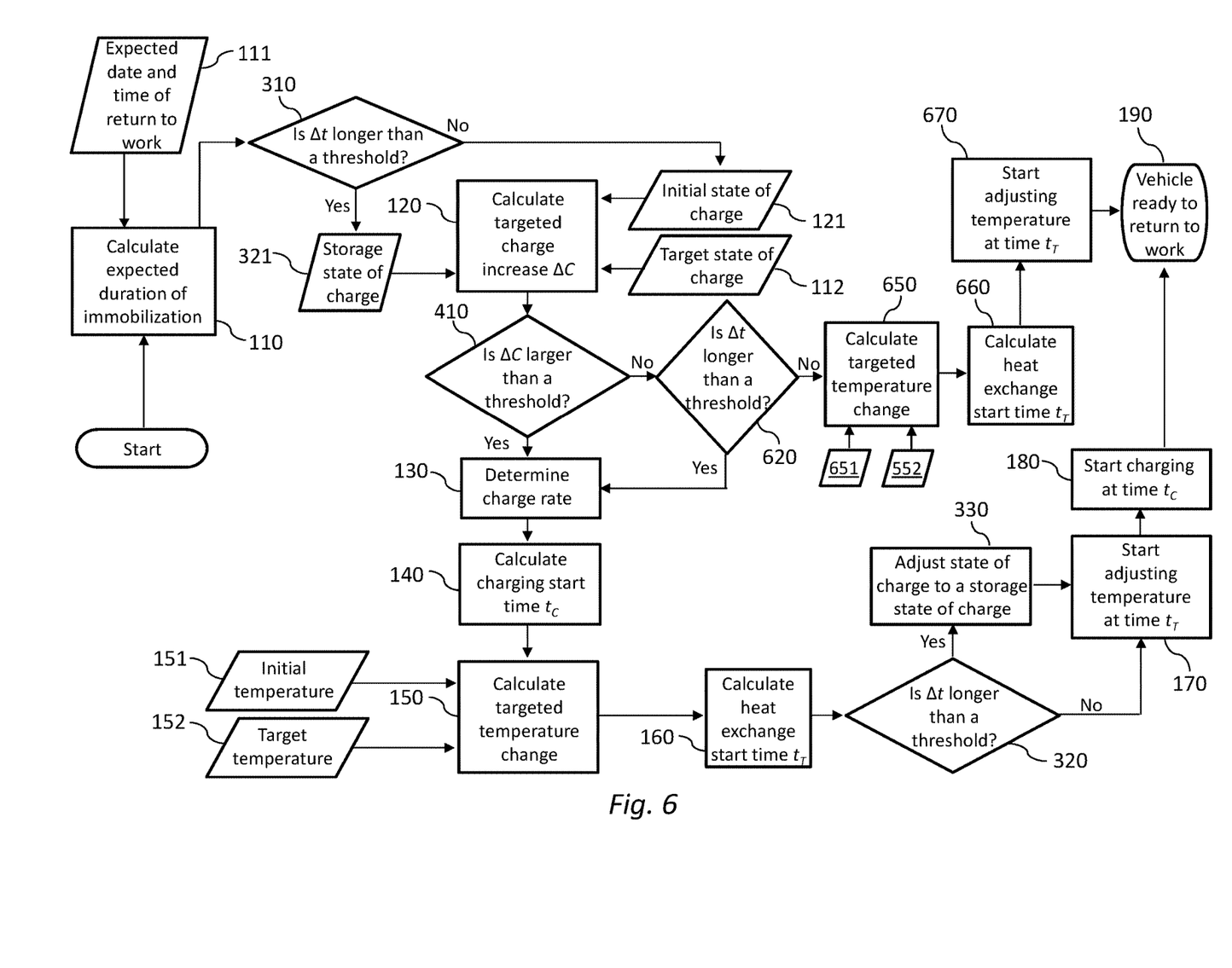
FIG. 6 shows a process for determining a charge rate and managing the state of charge of a battery wherein the battery may be stored at a storage state of charge or battery may be charged in the event that the targeted charge increase is above a threshold, in accordance with an embodiment of the disclosure.

The processes shown in FIG. 3 and FIG. 4 may be combined, such that if the targeted charge increase is lower than the charge threshold but the expected duration of immobilization is longer than the storage threshold, the battery may be discharged to the storage state of charge value and the process may continue in line with FIG. 3. An example of such a process is shown in FIG. 6. In the event that the expected duration of immobilization is found to be longer than the storage threshold at step 310, the storage state of charge value 321 may be used to calculate the targeted charge increase at step 120. In the event that the expected duration of immobilization is found to be shorter than the storage threshold at step 310, the initial state of charge value 121 of the battery may be used to calculate the targeted charge increase at step 120. The targeted charge increase may then be compared of the charge threshold at step 410.

In the event that the targeted charge increase is larger than the charge threshold, the process may proceed similarly to FIG. 3. Reference numerals are the same for steps which are the same as FIG. 3. The charge rate is determined at step 130, and the charging start time is calculated at step 140. The targeted temperature change is calculated at step 150, and the heat exchange start time is calculated at step 160. In the event that the duration of immobilization is shorter than the storage threshold at step 320, the next step 170 may be to heat or cool the battery to the target temperature 152 at the heat exchange start time $t_T$. At the charging start time $t_C$ the battery is at the target temperature 152 and charging begins at the charge rate until the state of charge value is equal to the target state of charge 122. The vehicle is then ready to return to work at the return to work time, at step 190. In the event that the duration of immobilization is longer than the storage threshold at step 320, there may be an additional step 330 in which the actual state of charge of the battery is adjusted to be equal to the storage state of charge value 321. The state of charge of the battery may be maintained at the storage state of charge value 321 until the charging start time $t_C$.

In the event that at step 410 the targeted charge increase is smaller than the charge threshold, the duration of immobilization may be compared to the storage threshold at step 620. In the event that the duration of immobilization is longer than the storage threshold, the battery may be stored with a state of charge equal to the storage state of charge so the process continues in the same way as if the targeted charge increase was found to be larger than the charge threshold at step 410, by determining a charge rate at step 130. In the event that the duration of immobilization is shorter than the storage threshold, it may be that no discharging or charging takes place and only the temperature is adjusted. The targeted temperature change is calculated at step 650 using an initial temperature 651 and a target temperature 652, and the heat exchange start time $t_T$ is calculated at step 660. At the heat exchange start time $t_T$ the temperature is adjusted (step 670) and the vehicle is ready to return to work at the return to work time (step 190).

In certain embodiments, the processes shown in FIGS. 1 to 5 may be combined in various combinations.

In an embodiment of the disclosure the battery temperature may be obtained by measuring the temperature of the battery fluid. The heat exchange process may heat or cool the battery fluid using a liquid heat exchanger.

In a certain embodiment, the method may further comprise obtaining data indicative of battery health. The data indicative of battery health may comprise the state of charge values and temperature of the battery during charging, and in the subsequent charge cycle may be used at step 130 to determine the charge rate or to decide whether to perform a service process. In this way the charge cycle chosen may be adjusted if the data indicative of battery health shows that performance of the battery has declined.

The invention claimed is:

1. A method for managing state of charge of a battery of an electric work vehicle to be ready to return to work at a return to work time that coincides with an end of a duration of immobilization, comprising:
   a. obtaining data from the output of a user interface, wherein the data comprises an expected date and time of return to work;
   b. using the expected date and time of return to work to calculate an expected duration of immobilization of the electric work vehicle;
   c. using an initial state of charge value of the battery and a target operational state of charge value of the battery to calculate a targeted charge increase;
   d. determining a charge rate based on the expected duration of immobilization of the work vehicle and the targeted charge increase;
   e. calculating a charging start time based on the charge rate and the targeted charge increase, such that at the return to work time an actual state of charge of the battery is the target operational state of charge value;
   f. using an initial temperature of the battery and a target temperature of the battery to calculate a targeted temperature change;
   g. using the targeted temperature change to calculate a heat exchange start time such that the battery is at the target temperature at the charging start time;
   h. adjusting the temperature of the battery at the heat exchange start time such that the battery is at the target temperature at the charging start time; and
   i. starting the charge cycle at the charging start time such that the battery is at the target operational state of charge at the return to work time.

2. The method of claim 1 wherein the electric work vehicle comprises a hydraulic circuit for effecting movement of a machine work tool and wherein the method further comprises warming hydraulic fluid in the hydraulic circuit such that the hydraulic fluid is at a target hydraulic fluid temperature at the return to work time.

3. The method of claim 1 wherein the method step (b) further comprises comparing the expected duration of immobilization to a storage threshold and, in the event that the expected duration of immobilization is longer than the storage threshold, using a storage state of charge value as the initial state of charge at step (c).

4. The method of claim 3 wherein the method further comprises adjusting the state of charge of the battery to the storage state of charge value after step (g).

5. The method of claim 1 wherein the storage state of charge value is between 40% and 50%.

6. The method of claim 1 wherein the method further comprises performing a service process before the return to work time.

7. The method of claim 1 wherein the method further comprises obtaining data indicative of battery health.

8. The method of claim 1 further comprising comparting the targeted charge increase to a charge threshold, wherein in an event that the targeted charge increase is smaller than the charge threshold the targeted charge increase is zero.

9. The method of claim 1 wherein the charging start time may be further based on external factors which vary over the expected duration of immobilization, wherein the external factors comprise one or more of:
   a. cost of electricity; and
   b. temperature of the environment.

10. A battery charging controller for managing state of charge of a battery of an electric work vehicle to be ready to return to work at a return to work time that coincides with an end of a duration of immobilization, the battery charging controller configured to:
    a. receive first data from a user interface, wherein the first data is indicative of a date and time of expected return to work;
    b. receive second data comprising an initial state of charge value of the battery;
    c. receive third data comprising an initial temperature of the battery;
    d. use the first data to calculate an expected duration of immobilization;
    e. use the second data and a target operational state of charge of the battery to calculate a targeted charge increase;
    f. determine a charge rate based on the expected duration of immobilization of the work vehicle, the targeted charge increase and data indicative of battery health;
    g. calculate a charging start time based on the charge rate and the targeted charge increase, such that at the return to work time an actual state of charge of the battery is the target operational state of charge value;
    h. use the third data and a target temperature of the battery to calculate a targeted temperature change;
    i. use the targeted temperature change to calculate a beat exchange start time such that the battery is at the target temperature before the charging start time;
    j. adjust the temperature of the battery at the heat exchange start time such that the battery is at the target temperature at the charging start time; and
    k. start the charge cycle at the charging start time such that the battery is at the target operational state of charge at the return to work time.

11. The battery charging controller of claim 10 wherein the electric work vehicle comprises a hydraulic circuit for effecting movement of a machine work tool and wherein the controller is further configured to warm hydraulic fluid in the hydraulic circuit such that the hydraulic fluid is at a target hydraulic fluid temperature at the return to work time.

12. The battery charging controller of claim 10 further configured to receive fourth data, wherein the fourth data comprises a storage state of charge value and wherein the battery charging controller is further configured to compare the expected duration of immobilization to a storage threshold and, in the event that the expected duration of immobilization is longer than the storage threshold, using the storage state of charge value as the second data comprising an initial state of charge value.

13. The battery charging controller of claim 12 wherein the controller is further configured to adjust the state of charge of the battery to the storage state of charge value after step (i).

14. The battery charging controller of claim 1 wherein the controller is further configured to perform a service process before the return to work time.

15. The battery charging controller of claim 1 wherein the controller is further configured to compare the targeted charge increase to a charge threshold, and in an event that the targeted charge increase is smaller than the charge threshold the targeted charge increase is zero.

\* \* \* \* \*